US010773806B2

(12) United States Patent
Gledich

(10) Patent No.: US 10,773,806 B2
(45) Date of Patent: Sep. 15, 2020

(54) SEAT ACTUATION CONTROL THROUGH IN-FLIGHT ENTERTAINMENT SYSTEM

(71) Applicant: Systems and Software Enterprises, LLC, Brea, CA (US)

(72) Inventor: Matthew Gledich, Mission Viejo, CA (US)

( * ) Notice: Subject to any disclaimer, the term of this patent is extended or adjusted under 35 U.S.C. 154(b) by 343 days.

(21) Appl. No.: 15/947,358

(22) Filed: Apr. 6, 2018

(65) Prior Publication Data

US 2018/0290753 A1 Oct. 11, 2018

Related U.S. Application Data

(60) Provisional application No. 62/482,756, filed on Apr. 7, 2017.

(51) Int. Cl.
*B64D 11/06* (2006.01)
*B64D 11/00* (2006.01)

(52) U.S. Cl.
CPC .... *B64D 11/0639* (2014.12); *B64D 11/00151* (2014.12); *B64D 11/00155* (2014.12); *B64D 11/064* (2014.12)

(58) Field of Classification Search
USPC .......................................................... 701/49
See application file for complete search history.

(56) References Cited

U.S. PATENT DOCUMENTS

| 7,182,402 | B1 * | 2/2007 | Ahad | B60N 2/22 297/354.12 |
| 8,141,946 | B2 | 3/2012 | Kramer | |
| 9,233,764 | B2 | 1/2016 | Oliveira | |
| 9,241,137 | B2 | 1/2016 | Frisco et al. | |
| 2005/0268319 | A1 | 12/2005 | Brady, Jr. | |
| 2008/0009989 | A1 * | 1/2008 | Kim | B60N 2/0232 701/36 |
| 2010/0176632 | A1 | 7/2010 | Alford et al. | |
| 2010/0318266 | A1 | 12/2010 | Schaaf et al. | |
| 2011/0219408 | A1 | 9/2011 | Frisco et al. | |

(Continued)

FOREIGN PATENT DOCUMENTS

| WO | 2005079310 | 9/2005 |
| WO | 2008128001 A2 | 10/2008 |
| WO | 2014209135 | 12/2014 |

OTHER PUBLICATIONS

International Search Report and Written Opinion for Application No. PCT/US2018/026542, dated Jul. 25, 2018; 12 pgs.

*Primary Examiner* — Lail A Kleinman
*Assistant Examiner* — Mahmoud M Kazimi
(74) *Attorney, Agent, or Firm* — Ryan Dean; Umberg Zipser, LLP

(57) ABSTRACT

Systems and methods are described for controlling seat actuation and other controls using an in-flight entertainment system of an aircraft or other vehicle. The system can include an electronic control unit configured to send commands to actuate a passenger seat based on input received via a passenger controlled device. The electronic control unit or a related peripheral component is configured to receive a flight phase notification. If the flight phase notification indicates a taxi, take-off or landing phase, the electronic control unit sends a command to disable actuation of the passenger seat. Such command could also be sent if the flight phase notification is not received for a predefined time period.

12 Claims, 4 Drawing Sheets

(56) References Cited

U.S. PATENT DOCUMENTS

| | | | |
|---|---|---|---|
| 2011/0282495 A1 | 11/2011 | Fischer et al. | |
| 2013/0113250 A1 | 5/2013 | Udriste | |
| 2015/0375865 A1* | 12/2015 | Fischer | B60N 2/77 |
| | | | 701/49 |
| 2016/0167788 A1* | 6/2016 | Thomaschewski | B64D 11/06395 |
| | | | 297/344.1 |
| 2016/0325837 A1* | 11/2016 | Erhel | B64D 11/0648 |
| 2018/0065521 A1* | 3/2018 | Vela | B60N 2/0228 |
| 2019/0002106 A1* | 1/2019 | Stachel | A47C 7/563 |

* cited by examiner

SEAT ACTUATION CONTROL THROUGH IN-FLIGHT ENTERTAINMENT SYSTEM

This application claims priority to U.S. provisional application having Ser. No. 62/482,756 filed on Apr. 7, 2017. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is seat actuation control systems, and, in particular, use of an in-flight entertainment system for seat actuation control in passenger aircraft or other vehicles.

BACKGROUND

The following description includes information that may be useful in understanding the present invention. It is not an admission that any of the information provided herein is prior art or relevant to the presently claimed invention, or that any publication specifically or implicitly referenced is prior art.

Seat Actuation Systems traditionally have passenger control units (PCUs) having physical buttons for the various controls of a seat. However, as the number of seat subsystems increases (e.g., heating/cooling, air cushions, reading lights, more seat motions, etc.), the complexity and number of buttons on the PCUs has increased. In addition, airlines are expecting deeper integrations between all seat subsystems.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for a dynamic, centralized control center for seat actuation and control.

SUMMARY OF THE INVENTION

The inventive subject matter provides apparatus, systems and methods in which an in-flight entertainment system is configured to control seat actuation. An electronic control unit is configured to send commands to actuate a passenger seat based on input received via a passenger controlled device. To prevent possible hazard, the electronic control unit can be utilized to ignore commands when the aircraft is in a taxi, take-off, or landing phase.

In addition, to ensure the seats are not moved during a taxi, take-off, or landing phase, the electronic control unit can be configured to not actuate a passenger seat if a flight notification indicates a taxi, take-off, or landing phase. The electronic control unit can be configured to not actuate a passenger seat if a flight notification is not received for a predefined time period, which may indicate some portion of the system has failed.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
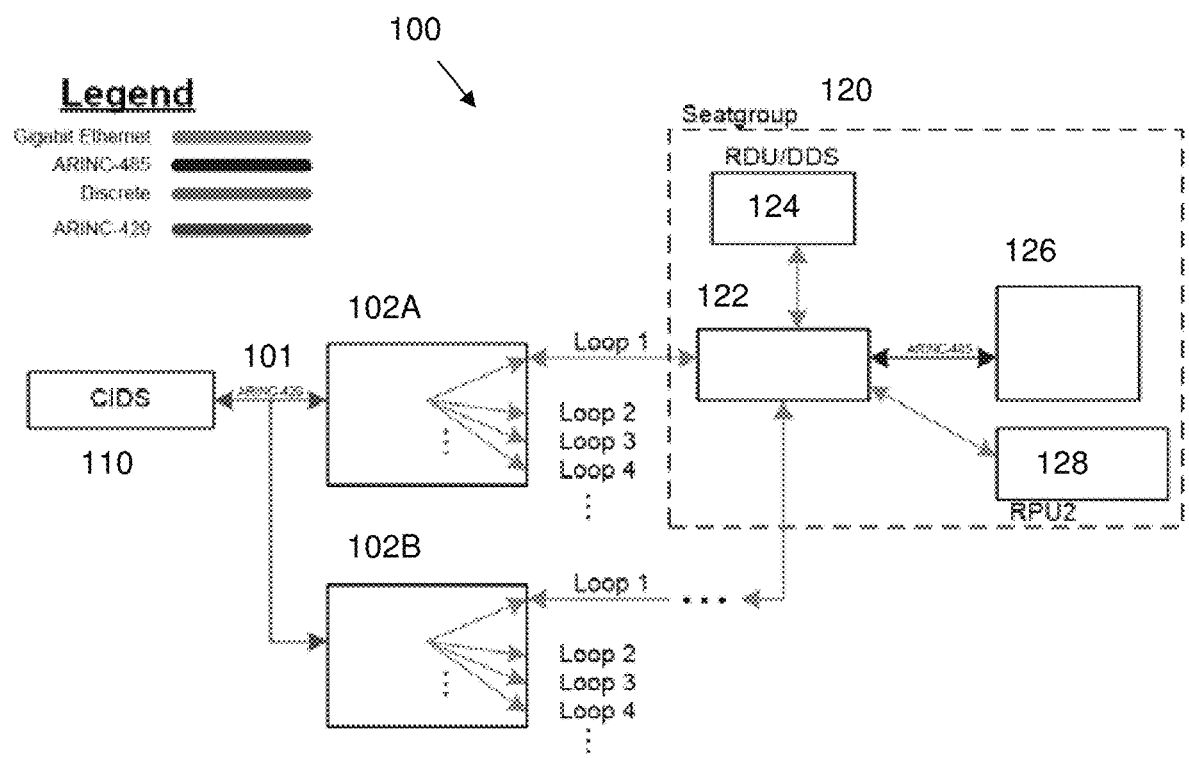
FIG. 1 illustrates an exemplary system architecture for Airbus™ A320™ and A330™ model aircraft.

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

In-flight entertainment (IFE) systems typically include a display disposed in the seatback (SDU) with one or more inputs for passenger use (e.g., touch screen, navigational passenger control unit (PCU), pairing with wireless device, etc.). Because many passenger aircraft now include IFE displays at each seat, the IFE system can be utilized to replace existing seat control units and allow for dynamic seat control using the graphical user interface (GUI) of the IFE system. In addition, the use of a GUI allows for future redesign of the look of the interface, as well the ability to add additional controls over time, all without requiring physical removal and installation of different physical controls.

It is further contemplated that any passenger controlled device could be used to send a command to actuate a passenger seat, including for example the SDU, a laptop, a tablet PC, a smart phone, and a smart watch. Where a passenger devices is used, it is contemplated that the command should be verified to ensure the aircraft is not in a taxi, take-off or landing (TTOL) phase prior to actuating the passenger seat. If a command is received but the required flight phase notification has not been received or indicates a TTOL phase, the command should be ignored.

In general, the control of most seat subsystems currently used has been deemed DAL E (e.g., no associated hazard) by Airbus™. However, the use of an IFE system to control seats has been deemed DAL D (minor hazard) by Airbus™, presenting challenges that must be addressed to allow for such control using the IFE system. For example, potential hazards include (i) entrapment of body parts during seat movement; (ii) the IFE system controlling multiple seats erroneously; and (iii) erroneous IFE seat control during TTOL phase. The solutions to these potential hazards are addressed below.

An exemplary diagram of a system 100 that permits seat actuation or other controls via the IFE system is shown in FIG. 1. System 100 includes one or more seat control units (SCUs) 102A, 102B, which are the interface point to the aircraft or other vehicle. On some platforms such as the Airbus™ A320™ and A330™, an interface 101 between one or more SCUs 102A, 102B and a Cabin Intercommunication Data System (CIDS) 110 is ARINC-429.

Each SCU can be communicatively coupled with an individual seat or a seatgroup 120 (set of seats). Within a typical business class seat, the SCU is communicatively coupled with a power supply (e.g., SPB4 122), which itself is coupled with one or more passenger displays (RDU/DDS) 124, a seat actuation system controller (e.g., electronic control unit (ECU)) 126 and sometimes a peripheral controller (processing unit RPU2) 128.

Figure 2:
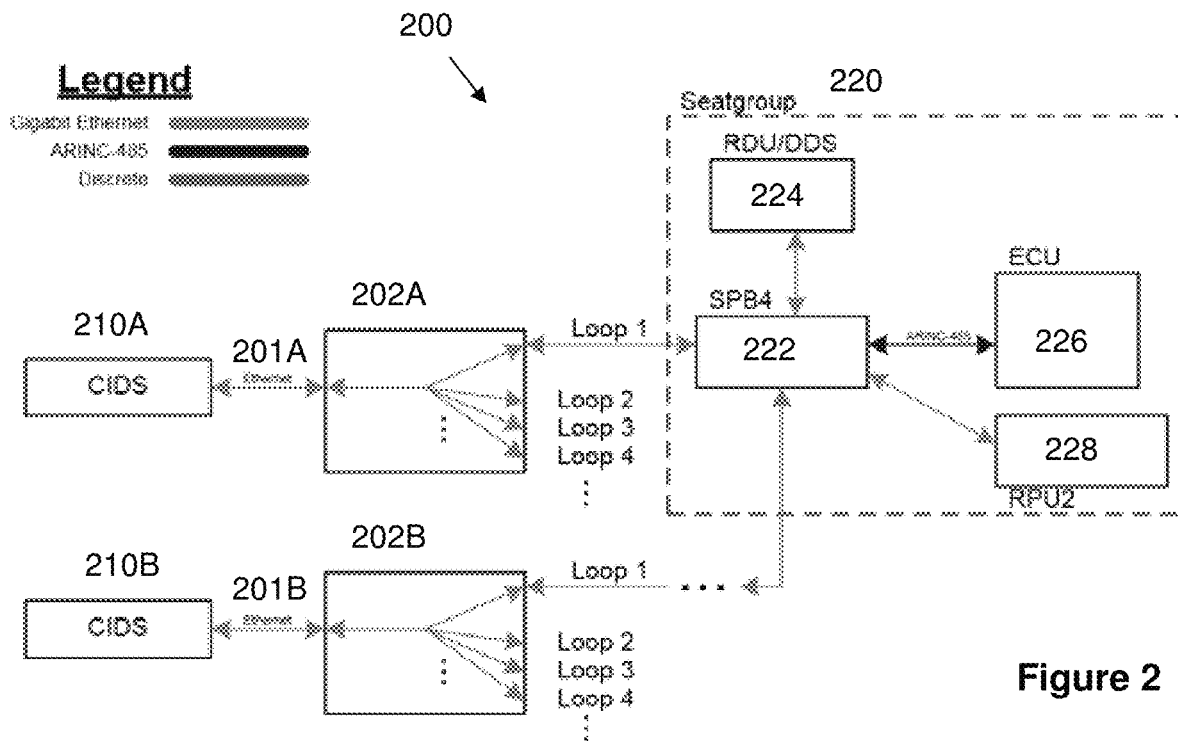
FIG. 2 illustrates an exemplary system architecture for Airbus™ A350™ model aircraft.

FIG. 2 illustrates a diagram of another embodiment of a system 200 that permits seat actuation or other controls via the IFE system. In this embodiment, the interface 201A between the SCU 202A and CIDS 210A is Ethernet, such as is used on the Airbus™ A350™. Interface 201B between the SCU 202B and CIDS 210B is also Ethernet.

Again, each SCU 202A, 202B can be communicatively coupled with an individual seat or a seatgroup 220 (set of seats). The SCUs could be coupled to a distinct seat or seatgroup or share a seat or seatgroup. Within a typical business class seat, the seatgroup 220 comprises a power supply (e.g., SPB4 222), which itself is coupled with one or more passenger displays (RDU/DDS) 224, a seat actuation system controller (e.g., electronic control unit (ECU)) 226 and sometimes a peripheral controller (processing unit RPU2) 228.

Figure 3:
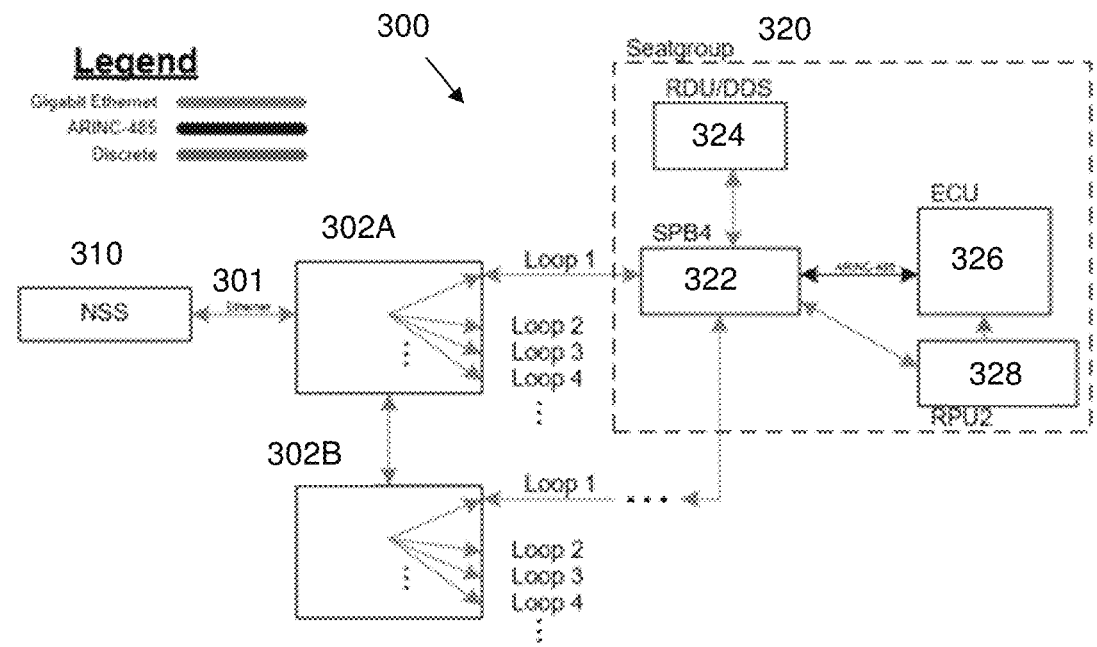
FIG. 3 illustrates an exemplary system architecture for Airbus™ A380™ model aircraft

FIG. 3 illustrates a diagram of another embodiment of a system 300 for use on the Airbus™ A380™. In this embodiment, a Network Server System (NSS) 310 is utilized instead of a CIDS for flight phase messaging, with the interface 301 between the NSS 310 and SCU 302A being Ethernet.

Again, the SCUs 302A, 302B can be communicatively coupled with an individual seat or a seatgroup 320. The SCUs 302A, 302B could be coupled to a distinct seat or seatgroup or share a seat or seatgroup. Within a typical business class seat, the seatgroup 320 comprises a power supply (e.g., SPB4 322), which itself is coupled with one or more passenger displays (RDU/DDS) 324, a seat actuation system controller (e.g., electronic control unit (ECU)) 326 and sometimes a peripheral controller (processing unit RPU2) 328.

Unlike the prior systems, the peripheral controller 328 when included can be communicatively coupled with the ECU 326, as further described below. In addition, it is contemplated that the SCUs 302A, 302B can also be communicatively coupled with one another.

The RAVE™ IFE system offered by Zodiac Inflight Innovations™ utilizes Gigabit Ethernet (both copper and fiber depending on the platform) to communicate from the SCUs down to line replaceable units (LRUs) or SDUs at the seats.

Although the below discussion references the system 300 shown in FIG. 3, it is contemplated that such discussion is applicable to those systems shown in FIGS. 1 and 2.

To address the potential hazard of body parts being trapped during seat movement, the ECU 326 can be configured to utilize an obstacle detection system with one or more sensors to detect when a seat motion is hitting an obstacle. When this is detected, the seat movement can be stopped and/or reversed. This is generally handled entirely within the Seat Actuation System and does not impact the integration of seat control in the IFE system.

Also note that this hazard has been added for clarity. There is a misperception that one of the hazards associated with IFE control is that the DAL E software within an IFE system could accidently send a seat movement command to the incorrect seat. Even if the IFE system did send a seat command to the incorrect seat, the command at worst would cause an inconvenience for the passenger in that seat. The mistaken command would not, however, create a hazard because the obstacle detection system is at all times local to the ECU 326 and will function regardless of where the command to move the seat originates (e.g., ECU PCU, IFE system, wireless device, etc.).

Another potential hazard is where the IFE system controls multiple seats erroneously, such as where a passenger-initiated seat movement command is sent to multiple seats within the cabin, for example, or a seat movement command is falsely generated for multiple seats. Again, while such mistaken command could inconvenience those passengers affected, and may result in an increased workload on the cabin crew, they would not pose a safety hazard. In such situations, the ECU 326 is configured to prevent any injuries, as the obstacle detection system would stop and/or reverse any motion of the seat upon detecting an obstacle such as a person in the seat. Moreover, were the system 300 to malfunction, the cabin crew could separately control or override the seats and return them to the TTOL position.

Another potential hazard is where the IFE system erroneously commands a seat into a non-TTOL position (e.g., reclined position) during a TTOL phase. This is a concern because most aircraft seats are not certified to fully protect passengers in reclined states during TTOL, and therefore is deemed a minor safety hazard. To avoid this situation, it is contemplated that the system 300 can be configured such that the ECU 326 ignores all IFE seat commands while the plane is in a TTOL phase. To do so, the ECU 326 would need to be aware of when the aircraft is in a TTOL phase.

One approach is to use a Tristate Keyline to disable IFE seat controls during TTOL phases. However, this is undesirable because if power to a passenger electronic device (PED) needed to be disconnected for any reason during flight, the Tristate Keyline would be used, resulting in the IFE seat controls also being disconnected and leaving passengers unable to recline their seats, for example. In addition, on different models of aircraft, different sources typically generate the Tristate Keylines (e.g., Secondary Power Distribution System (SPDB), Advanced Master Control Unit (AMCU), etc). Thus, implementation of such an approach would require additional time and coordination to deploy specific logic to the power distribution systems of each model of aircraft.

Another approach is to install a switch either at each seat or per seatgroup of the aircraft which the cabin crew would actuate before and after each TTOL phase, or between TTOL phases and non-TTOL phases. However, this is undesirable because actuating the switches would require a manual step and additional work/time of the cabin crew. In addition, the switches would likely increase the weight, complexity, reliability, and cost of the system.

Figure 4:
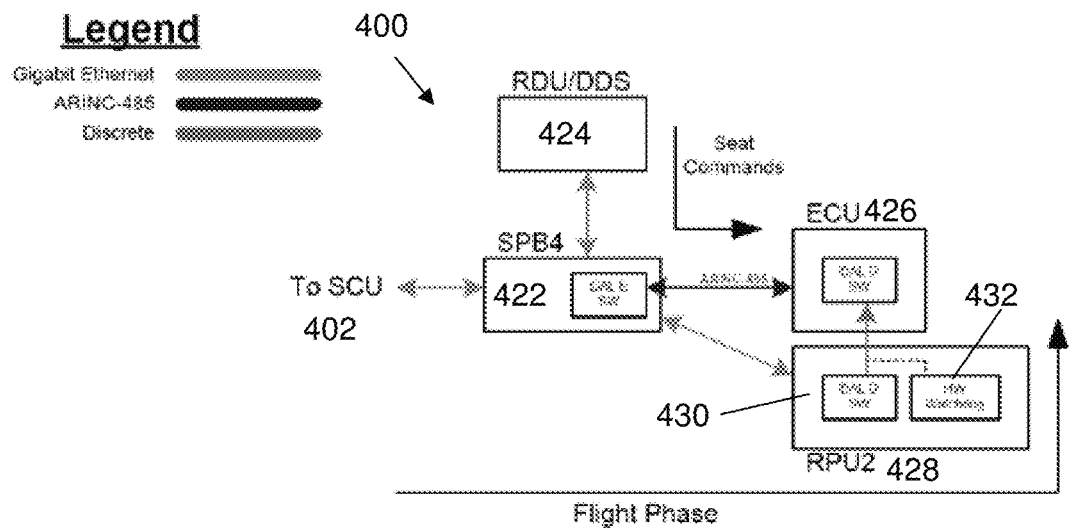
FIG. 4 illustrates an exemplary system architecture to permit or restrict seat control during TTOL phases.

A preferred approach is shown in FIG. 4, in which the system 400 is configured to include DAL D software 430 within a peripheral controller (processing unit RPU2) 428 to drive an output discrete to the ECU 426 and that depends on the flight phase. Thus, for example, during non-TTOL phases RPU2 428 can be configured to assert the discrete to the ECU 426; and de-assert the discrete to the ECU 426 during TTOL phases. This functionality will be referred to herein as "ECU TTOL Notification". In such systems, it is preferred that the circuitry that could falsely assert the output discrete has reliability greater than 1E-4 failures per flight hour.

In such system 400, which could be utilized with those systems described with respect to FIGS. 1-3, the flight phase can be received at the SCU 402 from the aircraft, such as over Ethernet or ARINC-429, for example, and then be transmitted to all of the passenger seats over the IFE Gigabit Ethernet network and via power supply 422. Advantageously, no software is needed to route the flight phase information, only DAL E hardware.

To ensure that the seats will be in proper position for TTOL phases even if there is a system malfunction, system 400 is preferably configured such that the RPU2 428 or other component will de-assert the discrete if a flight phase is not received for 10 seconds, for example. This period could of course be varied depending on the specific implementation and need, but the idea remains the same—if the signal is not received, the RPU2 428 will de-assert discrete to the ECU 426 and assume the aircraft is in a TTOL phase.

It is also contemplated that the RPU2 428 could include circuitry 432 to show the probability of failure of the top event Malfunction/Loss of "ECU TTOL Notification" on a seat level, which should be less than 1E-4 per flight hour to achieve the safety target, considering all applicable dormancy periods due to hidden failures. Such circuitry 432 could include a fault tree analysis on the circuitry configured to perform these functions, for example.

The system 400 can also be configured such that the RPU2 428 or other component will de-assert the discrete if DAL D software fails.

In some contemplated embodiments, it is contemplated that the seat could automatically revert to a TTOL position when discrete is de-asserted. Such automatic positioning could occur, for example, after presenting the passenger with a warning via the IFE display that such repositioning will occur in a set time period such as 30 or 60 seconds. This would advantageously ensure that the seats are all in the proper position prior to the aircraft entering a TTOL phase for example.

Thus, the system can be configured to de-assert the discrete if a TTOL flight phase message is received, or if no flight phase message is received for 10 seconds, indicating a likely disconnect and potential hazard.

Figure 5:
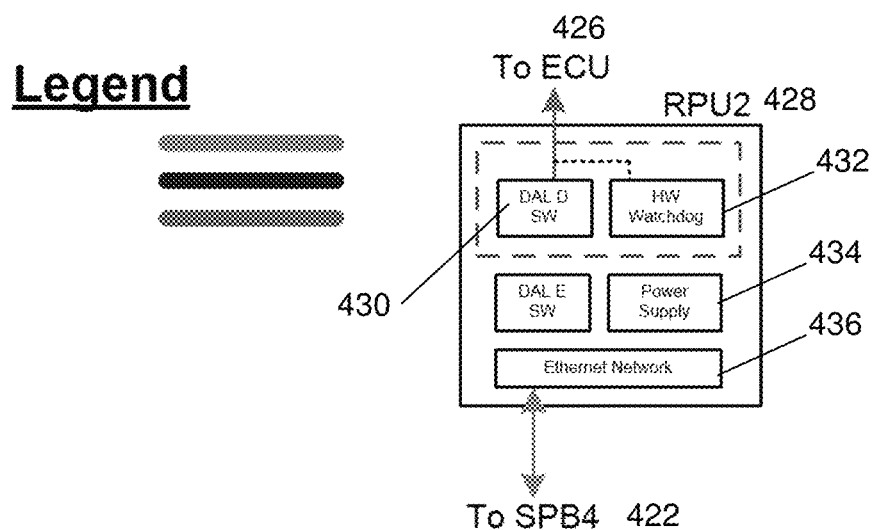
FIG. 5 illustrates an exemplary system architecture of a peripheral controller.

FIG. 5 depicts contemplated boundaries of what could be included in the 1E-4 failures per flight hour calculation. Due to the nature of the implementation (i.e. de-assert if incorrect or no flight phase is received), only the DAL D software 430 and hardware watchdog circuitry 432 needs to be considered. A failure of the power supply 434 will result in the discrete being de-asserted. A failure of the Ethernet network 436 will inhibit a flight phase message from reaching the DAL D software from the SPB4 422, and also result in the discrete being de-asserted.

The software involved in the "ECU TTOL Notification" functionality in the RPU2 428 is configured to meet DAL D requirements. It is further contemplated that the DAL D software component will be part of the hardware and will not be field programmable, and the DAL D software will be stored in a dedicated non-volatile storage space with appropriate documentation created.

Figure 6:
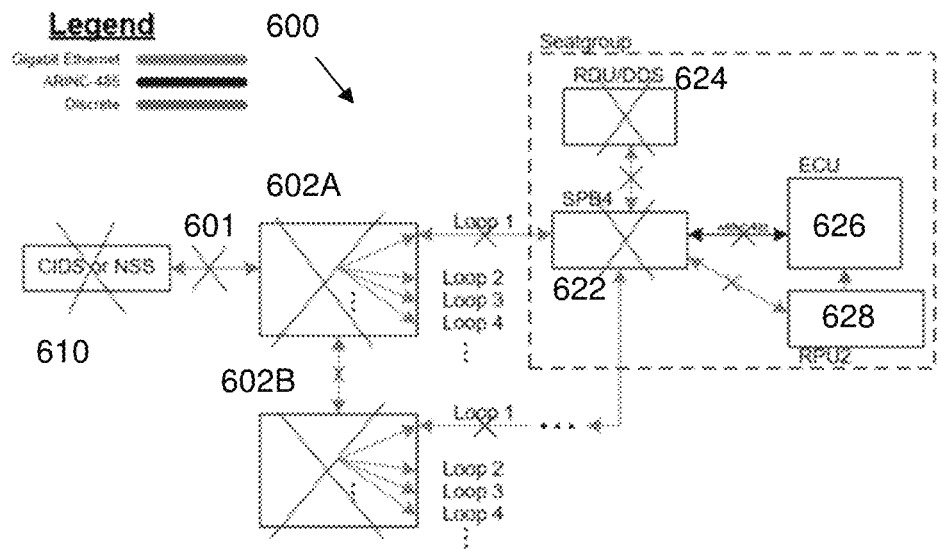
FIG. 6 illustrates an exemplary system architecture where there is communication failure between a CIDS or NSS and the peripheral controller or electronic control unit.

As shown in FIG. 6, should communication between the CIDS or NSS 610 and the RPU2 628 become unavailable for any reason (including but not limited to failure of the CIDS or NSS 610, cable 601 failure, SCU 602A, 602B failure, SPB4 622 failure, RDU/DDS 624 failure, etc.), the output discrete to the ECU 626 will be de-asserted, and remain de-asserted. This means that the ECU 626 will ignore all IFE seat movement commands until the failure is fixed and communication between CIDS or NSS 610 and the RPU2 628 is re-established.

Figure 7:
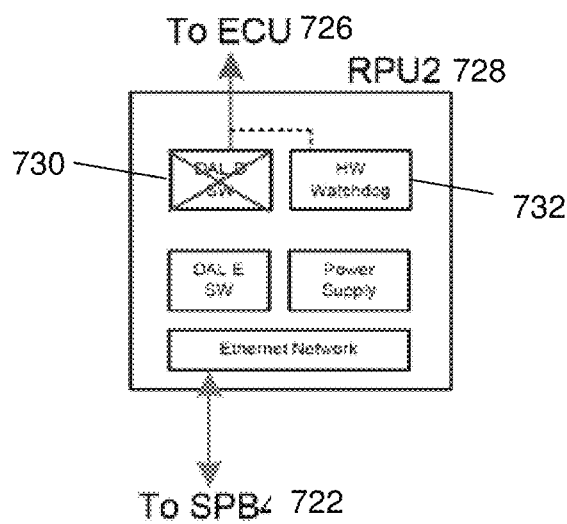
FIG. 7 illustrates an exemplary system architecture of a peripheral controller where the DAL D software has failed.

As shown in FIG. 7, if the DAL D software 730 (or hardware hosting the software) of the RPU2 728 fails, the hardware watchdog 732 can also be configured to de-assert the discrete output.

The A350™/A380™ approach cannot be fully utilized on the A320™ and A330™ platforms because it is reliant upon the aircraft generating an Ethernet message which contains the flight phase. In the A350™/A380™ approach, there is no software within the SCU which is involved in the creating of the flight phase Ethernet message, and thus the only IFE software in the system which needs to be DAL D is in the RPU2. On the A320™ and A330™ platforms, the flight phase is received by the SCU over ARINC-429 from CIDS. In order to convert the incoming ARINC-429 message into an Ethernet message that the RPU2 could utilize, DAL D software would be required within the SCU. Currently there are not provisions inside of the SCU3/SCU4 for a "DAL D ECU TTOL Notification" function.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An in-flight entertainment system configured to control seat actuation, comprising:
   an electronic control unit configured to send commands to actuate a passenger seat based on input received via a passenger controlled device;
   wherein the electronic control unit is configured to receive a flight phase notification directly or through a peripheral controller;
   wherein if the flight phase notification indicates a taxi, takeoff and landing phase, the electronic control unit sends a command to disable actuation of the passenger seat; and
   wherein if the flight phase notification is not received for a predefined time period, the electronic control unit sends a command to disable actuation of the passenger seat.

2. The system of claim 1, wherein the passenger controlled device is selected from the group consisting of a seat display unit (SDU) and a portable computing device.

3. The system of claim 2, wherein the portable computing device is selected from the group consisting of a tablet PC, a laptop, a smart phone, and a smart watch.

4. The system of claim 1, wherein after receiving the flight phase notification indicating a TTOL phase, the electronic control unit sends a command to cause a passenger seat to be placed the seat in a TTOL position.

5. The system of claim 4, wherein the command from the electronic control unit is delayed by a set time period following receipt of the flight phase notification.

6. The system of claim 5, wherein after receiving the flight phase notification indicating the TTOL phase, the electronic control unit sends a second command to the passenger controlled device to present a notification that the passenger seat will be placed in the TTOL position after the set time period elapses.

7. The system of claim 1, further comprising a peripheral controller communicatively coupled with the electronic control unit, and configured to drive an output discrete to the electronic control unit as a function of a flight phase.

8. The system of claim 7, wherein if the flight phase notification indicates a non-TTOL phase, the peripheral controller drives the output discrete to the electronic control unit.

9. The system of claim 7, wherein if the flight phase notification indicates the TTOL phase, the peripheral controller de-asserts the discrete to the electronic control unit.

10. The system of claim 7, wherein the peripheral controller de-asserts the discrete to the electronic control unit if a flight phase notification is not received for a predefined time period.

11. The system of claim 7, wherein the peripheral controller de-asserts the discrete to the electronic control unit if the peripheral controller detects a DAL D software of the peripheral controller has failed.

12. The system of claim 1, wherein the electronic control unit is configured to receive the flight phase notification from a seat control unit.

* * * * *